United States Patent [19]

Carlsen et al.

[11] Patent Number: 4,500,654
[45] Date of Patent: Feb. 19, 1985

[54] CATALYST SYSTEM AND PROCESS FOR THE PRODUCTION OF POLYURETHANES

[75] Inventors: Russell O. Carlsen, Barrington; Francois M. Casati, Highland Park; Daniel S. Raden, Hawthorn Woods, all of Ill.

[73] Assignee: Abbott Laboratories, North Chicago, Ill.

[21] Appl. No.: 547,691

[22] Filed: Nov. 1, 1983

[51] Int. Cl.$^3$ .................. C08G 18/20; C08G 18/14; B01J 27/24
[52] U.S. Cl. .................... 521/129; 521/128; 528/52; 528/53; 544/177; 544/398
[58] Field of Search .................. 521/129, 128; 528/53, 528/52; 252/438; 544/177, 398

[56] References Cited

U.S. PATENT DOCUMENTS

| | | | |
|---|---|---|---|
| 2,508,652 | 5/1950 | Ross et al. | 544/398 |
| 2,508,653 | 5/1950 | Malkemus et al. | 544/398 |
| 2,838,510 | 6/1958 | Suter et al. | 544/177 |
| 4,011,223 | 3/1977 | Priest et al. | 260/268 R |
| 4,228,248 | 4/1980 | Zimmerman | 521/115 |
| 4,248,930 | 2/1981 | Haas et al. | 521/129 |
| 4,326,042 | 4/1982 | Zimmerman | 521/129 |
| 4,376,832 | 3/1983 | Speranza et al. | 521/129 |

Primary Examiner—Herbert S. Cockeram
Attorney, Agent, or Firm—Steven F. Weinstock; Martin L. Katz

[57] ABSTRACT

A catalyst and process are provided for producing polyurethanes by contacting an organic polyol and an organic isocyanate with a catalyst comprising an N-substituted alkoxyalkyl piperazine and preferably additionally comprising an N-alkoxyalkyl morpholine wherein the alkylene moieties of the morpholine and piperazine are independently selected from the group consisting of $C_1$ to about $C_5$ alkylene moieties, and wherein the alkoxy moieties are independently selected from the group consisting of $C_1$ to about $C_3$ alkoxy moieties.

20 Claims, No Drawings

CATALYST SYSTEM AND PROCESS FOR THE PRODUCTION OF POLYURETHANES

BACKGROUND OF THE INVENTION

The present invention relates to a catalyst and process for producing polyurethanes from organic isocyanates and organic polyols.

Polyurethanes typically are produced by the reaction of organic isocyanates with polyester or polyether polyols.

A catalyst useful for producing a polyurethane from an organic polyisocyanate and an organic polyester polyol is disclosed by U.S. Pat. No. 4,326,042 to Zimmerman. This catalyst comprises catalytic amounts of N-methoxypropylmorpholine, N-butylmorpholine, and N,N'-dimethylpiperazine.

U.S. Pat. No. 4,228,248, to Zimmerman, discloses a method for producing a polyurethane by reacting an organic polyisocyanate with an organic polyester or polyether polyol in the presence of an amine which is a N-ethylalkoxy morpholine compound.

Other catalysts useful for producing polyurethanes are known in the art. These catalysts include triethylene diamine, N-ethyl morpholine (NEM), dimethyl amino ethanol, N,N,N',N'-tetramethylethylene diamine and N,N-dimethylbenzylamine (DMBA).

Many of these catalysts, however, suffer from the disadvantage of being toxic to humans. This toxicity increases the hazard of producing polyurethanes, and is of a major concern to polyurethane producers. Many of these catalysts also have the disadvantage of giving off extremely unpleasant odors. These odors make polyurethane producing processes extremely unpleasant to be around, and may result in a product having a residual odor which makes the product unacceptable for its intended use. Although non toxic or non odoriferous catalysts are known in the art, in many instances these catalysts fail to yield polyurethanes with appropriate properties.

This problem is particularly acute with polyurethane foams which require the catalyst to predominantly promote the "gas" reaction, rather than the gelling reaction, in order to produce a foam of appropriate height and foam openness. In addition, the catalyst must cause the reaction to proceed quickly enough to allow a foam of suitable height to form and gel before blowing gases escape.

It is therefore an object of the present invention to provide a catalyst and a process for producing polyurethane foams wherein the catalyst has diminished toxicity and may be used to produce a polyurethane which is substantially odor free.

It is also an object of the present invention to provide a catalyst and process which may be used to produce a polyurethane foam of suitable foam height and foam openness.

SUMMARY OF THE INVENTION

These and other objects and advantages of the present invention may be accomplished by means of a process wherein the catalyst comprises an N-substituted alkoxyalkyl piperazine and preferably comprises an N-substituted alkoxyalkyl piperazine and an N-alkoxyalkyl morpholine. The alkylene moieties of the N-substituted alkoxyalkyl piperazine and the N-alkoxyalkyl morpholine preferably are independently selected from the group consisting of $C_1$ to about $C_5$ alkylene moieties. Similarly, the alkoxy moieties are selected from the group consisting of $C_1$ to about $C_3$ alkoxy moieties. The piperazine preferably is N'-alkyl or alkoxyalkyl substituted, wherein the N'-alkyl group preferably is a $C_1$ to about $C_5$ alkyl and the alkoxyalkyl group preferably has a $C_1$ to about $C_5$ alkylene moiety and a $C_1$ to about $C_3$ alkoxy moiety.

DETAILED DESCRIPTION OF THE INVENTION

Polyurethanes generally may be produced by reacting organic isocyanates with organic polyols. When a blowing agent is included in the reaction mixture or is produced by the reaction of the isocyanate with the polyol or the reaction of other components, a polyurethane foam is produced. Both polyurethane and polyurethane foams have many uses known in the art. These include uses such as fibers, adhesives, coatings, elastomers and foams for use in seats for automobiles, furniture and underlayers for rugs.

Polyols are organic polymers well known in the art. These polymers contain pendent hydroxyl groups which react with the isocyanate to bind the polyol and isocyanate together into a polyurethane. A variety of polyols are available commercially or may be produced by the reaction of an organic oxide and a compound containing two or more active hydrogens, such as glycols, water, acids or amines. Organic polyols particularly suitable for use in conjunction with the process and catalyst of the present invention include polyether polyols and polyester polyols.

Organic isocyanates suitable for use in the present invention are known in the art. Types of isocyanates most widely used for preparation of polyurethanes are toluene diisocyanate (TDI), crude toluene diisocyanate and several types of polymeric isocyanates such as diphenylmethane-4-4'-diisocyanate, and polymethylenepolyphenyl isocyanate. The isocyanate most frequently used to produce a flexible polyurethane foam is an isomeric blend of distilled TDI containing 2,4-toluene diisocyanate and 2,6-toluene diisocyanate.

Organic polyols and organic isocyanates may be polymerized to form useful polyurethanes by contacting the polyol and isocyanate with a catalyst comprising an N-substituted alkoxyalkyl piperazine.

Preferably the piperazine compound useful in the catalyst and process of the present invention is generally described by the formula:

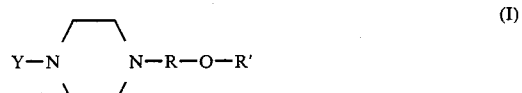

(I)

wherein:
Y is selected from the group consisting of (a) hydrogen; (b) alkyl groups having 1 to about 5 carbon atoms, preferably 1 to about 3 carbon atoms; and (c) the moiety generally described by the formula:

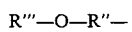

R and R" are independently selected from alkylene groups having 1 to about 5 carbon atoms; and
R' and R'" are independently selected from alkyl groups having 1 to about 3 carbon atoms.

The size of the alkylene moieties R and R'' affect the basicity of the piperazine compound. Although the piperazine compound should be one which is sufficiently basic to catalyze the polyol/isocyanate reaction, a compound which is too basic may cause the reaction to proceed so rapidly that the polyurethane product is scorched. Due to the fact that the tendency toward weaker basicity is directly related to chain length, alkylene moieties of at least 2 carbon atoms are preferred.

Further, the piperazine compound should be one which does not present substantial steric hindrance to the reactants because this may result in an unacceptably long reaction time inconsistent with good foam formation. Consequently, it is preferred that R, and R'', when applicable, be independently selected from the group consisting of ethylene, propylene and butylene moieties. It is further preferred that alkylene moieties be unbranched because a branched alkylene moiety may increase the steric hindrance of the compound.

Steric hindrance is also a consideration in selecting the alkoxy groups of the piperazine compound. R' and R''' groups substantially larger than about 3 carbon atoms may present substantial hindrance to the reactants. Methyl is most preferred, such as in N-methoxypropyl-N'-ethyl piperazine, N,N'-bis(methoxypropyl) piperazine and N-methoxypropyl piperazine.

Examples of piperazine compounds consistent with the present invention include N,N'-bis(methoxyethyl) piperazine, N,N'-bis(methoxypropyl) piperazine, N,N'-bis(propoxypropyl) piperazine, N,N'-bis(methoxypentyl) piperazine, N-methoxypropyl-N'-ethoxypropyl piperazine and N-methoxyethyl-N'-methoxypropyl piperazine. N-methoxyethyl-N'butyl piperazine, N-methoxyethyl-N'-pentyl piperazine, N-propoxybutyl piperazine, N-ethoxypentyl piperazine, N-methoxypentyl-N'-ethyl piperazine, N-methoxybutyl piperazine, N-ethoxypropyl piperazine, N-ethoxypropyl-N'-methyl piperazine, N-methoxypropyl piperazine, and N-methoxyethyl-N'-ethyl piperazine. Propyl piperazines, such as N-methoxypropyl piperazine, N,N'-bis(methoxypropyl) piperazine and N-methoxypropyl-N'methyl piperazine are most preferred.

In an embodiment of the catalyst and process of the present invention, the catalyst additionally comprises an N-alkoxyalkyl morpholine. This morpholine compound may be generally described by the formula:

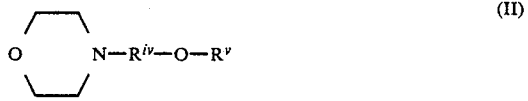

(II)

wherein:
R$^{iv}$ is an alkylene group having 1 to about 5 carbon atoms; and
R$^v$ is an alkyl group having 1 to about 3 carbon atoms.
It is further preferred that R$^{iv}$ be selected from ethylene, propylene and n-butylene moieties. Propyl morpholines, however, are most preferred.
Suitable morpholine compounds include those morpholines wherein R$^v$ has 1 to about 3 carbon atoms. It is preferred, however, that R$^v$ be selected from the group consisting of methyl or ethyl. Due to the relatively small size of the methyl group, however, methoxyalkyl morpholines are most preferred.

Examples of morpholine compounds consistent with this embodiment include N-ethoxymethyl morpholine, N-methoxyethyl morpholine, N-methoxypropyl morpholine, N-propoxypropyl morpholine, N-methoxy-n-butyl morpholine, N-ethoxybutyl morpholine and N-methoxypentyl morpholine.

The morpholine and piperazine compounds of the present invention may be prepared using known materials and techniques. For example, N-methoxypropyl morpholine and N-methoxypropyl-N'-methyl piperazine may be prepared by reacting morpholine or N-methyl piperazine with 3-methoxypropionitrile.

In the embodiment of the present invention wherein the catalyst comprises a piperazine and a morpholine, the ratio by weight of the morpholine compound to the piperazine compound preferably is about 10:1 to 1:10. Ratios in excess of this range may result in polyurethanes which do not have appropriate cell openness, reaction time or foam height. It is further preferred that the ratio be about 5:1-1:5, with a ratio of about 3:1-1:3 being most preferred. Usually, however, the ratio will be at least equal to 1.

The appropriate proportion of the catalyst to other components in the process of the present invention may be determined in relation to the polyol. This proportion is the amount of catalyst, by weight in grams, per one hundred grams of the polyol. This relationship is often termed "php" or parts per hundred polyol. Although not critical to the present invention, it is preferred that the catalyst be present in amounts of about 0.5 to 4 php. About 1 to 3 php is most preferred.

The proportion of organic isocyanate to organic polyol will depend on many factors, such as the type of polyurethane product desired, the type of isocyanate and the type of polyol. In most polyurethane foams, however, the ratio of isocyanate to polyol, by weight, will be about 0.25:1 to 1:1.

Procedure and process parameters for the preparation of foams are not critical to the present invention. A discussion of process procedures and parameters may be found in U.S. Pat. No. 4,228,248 to Zimmerman.

SPECIFIC EMBODIMENTS

Comparative examples and examples embodying aspects of the present invention were conducted. Unless otherwise noted, these examples were conducted using the following procedure and the formulations noted below. Unless otherwise noted, portions in the formulations are parts by weight. Components were fed to a mixing chamber in three streams, namely polyol, TDI and activator streams, with the activator stream including a surfactant, water, co-catalyst, and catalyst. The resulting mixture was placed in a Fluidyne ® foaming column adapted to give a computerized readout of reaction parameters. These parameters include the time elapsed before a significant polyol/TDI reaction was initiated ($T_I$), the total time it took for the foam to expand to its maximum height ($T_R$), the peak rise rate at $T_p$ ($dx/dt$), the elapsed time until maximum rate of expansion ($T_p$), the maximum pressure exerted by the foam (P), the time elapsed until the foam gelled ($T_G$), and the time elapsed until the peak pressure was exerted ($T^A$). These and other symbols and definitions are summarized in Table 1.

COMPARATIVE EXAMPLES 1,2; EXAMPLES 3-5

The formulation for Examples 1-5 included 100 parts of RN-490, a polyether available from the Dow Chemical Company, Inc., 1.5 parts of DC-193, a silicone surfactant available from the Dow Corning Corporation, 36.5 parts Freon® 11, methyldiphenyl diisocyanate, index 105, and 1.6 php of the catalysts indicated in Table 2. Comparative Examples 1 and 2 were performed using N-ethyl morpholine, a catalyst known in the art, and N-methoxypropyl morpholine without piperazine. Examples 3–5 were performed using various embodiments of the present invention wherein the catalyst comprises an N-alkoxyalkyl substituted piperazine. The results of these experiments are indicated in Table 2.

The formulation for Examples 6–21 included 100 parts of a polyester polyol, Fomrez 53, available from Witco Chemical Corporation; 4.0 parts water; 1.2 parts of a silicone surfactant L532 available from Union Carbide Corporation; 48 parts of an 80/20 mixture of 2,4-toluene diisocyanate and 2,6-toluene diisocyanate; 0.3 parts of cetyl dimethyl amine co-catalyst; and the particular catalyst to be tested.

COMPARATIVE EXAMPLES 6,8; EXAMPLES 7,9

Examples 6–9 were conducted to demonstrate the performance of the process of the present invention in comparison with the performance of equal amounts of DMBA. A comparison with DMBA is of particular interest due to DMBA's acceptance as a polyurethane catalyst and its relatively high toxicity. These examples were conducted using the formulation and procedure described above with the catalyst and amounts indicated in Table 3. Data from these experiments are shown in Table 3 and demonstrate the utility of the catalysts of the present invention.

COMPARATIVE EXAMPLES 10,11

Experiments for Comparative Examples 10,11 were conducted to demonstrate the performance of various single catalysts and to provide a baseline for comparison with the catalyst and process of the present invention. These experiments were conducted using the above-indicated procedure and formulation, using the proportions of catalyst indicated in Table 4.

EXAMPLES 12-21

A series of experiments were performed to demonstrate various embodiments of the present invention. These experiments, reported as Examples 12 through 21, were conducted using the above procedure and formulation with the catalysts, amounts and proportions indicated in Table 4. Data collected during these experiments is reported in Table 4. This data reveals that the catalyst and process of the present invention may be used to produce a polyurethane foam which is at least commensurate in characteristics and reaction performance with foams produced by the catalysts in Comparative Examples 10 and 11. As Table 4 shows, the catalyst and process of the present invention may be used to produce an open foam which displays no significant shrinkage. In addition, the catalyst may be used to produce a medium tight foam, which has many uses, such as for packing material and insulation. Further, none of the foams produced in Examples 12 through 21 exhibited significant residual odor. This is in contrast to the foam produced in Example 10 using NEM, which typically has a strong odor.

Compression tests were performed on the foams produced in Examples 10, 11, and 17 through 21. These tests were performed using standard ASTM test procedures. In this test a $2 \times 2 \times 1$ inch piece of foam was compressed between two plates at a set temperature and humidity. For the 50% and 90% compression tests, the foam was squeezed between the plates to decrease the height of the foam by 50 and 90%, respectively. The foam was left in the compression apparatus for a set period of time, after which the pressure was released. The percent of the foam's original height lost as a result of compression was then measured, and is reported in Table 5 as "set 50%" or "set 90%". As an examination of Table 5 indicates, the catalyst system of the present invention may be used to produce a polyurethane foam with compression set characteristics well within the range of those produced by other catalysts, without the toxicity and odor characteristic of catalysts known in the art.

It will be understood that various changes and modifications may be made in the above described catalyst system and process without departing from the spirit of the invention, particularly as defined in the following claims.

TABLE 1

| SYMBOL | DEFINITION |
|---|---|
| X | Rise Height |
| $T_I$ | Initiation Time (Sec.) |
| $T_R$ | Rise Time |
| $T_F$ | Foaming Time ($T_R - T_I$) |
| dx/dt | Peak Rise Rate (Inches/Min.) |
| $T_p$ | Time to Peak Rate of Rise |
| P | Maximum Pressure |
| $T_G$ | Gel Time (Seconds) |
| $T_A$ | Time to Maximum Pressure |
| NEM | N—ethyl morpholine |
| NMPM | N—methoxypropyl morpholine |
| NMPNMP | N—methoxypropyl-N'—methyl piperazine |
| NMPP | N—methoxypropyl piperazine |
| NN'MPP | N,N'bis(methoxypropyl) piperazine |
| DMBA | Dimethylbenzylamine |

TABLE 2

| EX. | CATALYST | X | $T_I$ | $T_R$ | $T_F$ | dx/dt | $T_p$ | P | $T_G$ | $T_A$ | $T_G-T_I$ |
|---|---|---|---|---|---|---|---|---|---|---|---|
| 1 | NEM | 15.25 | 145 | 273 | 128 | 11.71 | 160 | 1.88 | 256 | 466 | 210 |
| 2 | NMPM | 15.59 | 155 | 306 | 151 | 10.25 | 158 | 1.59 | 283 | 491 | 128 |
| 3 | NMPNMP | 15.30 | 117 | 216 | 99 | 14.64 | 141 | 1.88 | 206 | 386 | 89 |
| 4 | NMPP | 14.86 | 140 | 282 | 142 | 11.71 | 141 | 2.06 | 254 | 450 | 114 |
| 5 | NN'MPP | 15.25 | 133 | 270 | 137 | 11.71 | 135 | 1.77 | 240 | 448 | 107 |

TABLE 3

| EX. | CATALYST | PHP | X | $T_I$ | $T_R$ | $T_F$ | dx/dt | $T_p$ | P | $T_G$ | $T_A$ |
|---|---|---|---|---|---|---|---|---|---|---|---|
| 6 | DMBA | 1.0 | 16.49 | 32 | 72 | 40 | 35.14 | 45 | — | — | 81 |
| 7 | NMPNMP | 1.0 | 18.42 | 25 | 57 | 32 | 49.78 | 35 | 0.84 | 29 | 65 |
| 8 | DMBA | 0.75 | 17.40 | 38 | 93 | 55 | 29.28 | 53 | 0.18 | 92 | 103 |

TABLE 3-continued

| EX. | CATALYST | PHP | X | $T_I$ | $T_R$ | $T_F$ | dx/dt | $T_p$ | P | $T_G$ | $T_A$ |
|---|---|---|---|---|---|---|---|---|---|---|---|
| 9 | NMPNMP | 0.75 | 18.10 | 31 | 73 | 42 | 36.60 | 43 | 0.71 | 35 | 83 |

TABLE 4

| EX. | CATALYST | PHP | X | $T_I$ | $T_R$ | $T_F$ | dx/dt | $T_p$ | P | $T_G$ | $T_A$ | REMARKS |
|---|---|---|---|---|---|---|---|---|---|---|---|---|
| 10 | NEM | 2.0 | 17.64 | 27 | 67 | 40 | 39.53 | 37 | 0.82 | 32 | 73 | Foam very open. |
| 11 | NMPM | 3.0 | 16.49 | 37 | 84 | 47 | 27.82 | 55 | — | — | — | Foam very open. |
| 12 | NMPNMP | 1.0 | 18.42 | 25 | 57 | 32 | 49.78 | 35 | 0.84 | 29 | 65 | Top shrink. |
| 13 | NMPNMP | 0.75 | 18.10 | 31 | 73 | 42 | 36.60 | 43 | 0.70 | 35 | 65 | Top shrink. |
| 14 | NN'MPP | 2.0 | 16.81 | 27 | 60 | 33 | 46.85 | 41 | — | — | — | Strong shrink of top. |
| 15 | NMPM NMPNMP | 1.0 0.5 | 17.23 | 34 | 80 | 46 | 30.74 | 52 | 0.13 | — | 86 | Foam open. |
| 16 | NMPM NMPNMP | 1.7 0.5 | 15.86 | 39 | 99 | 50 | 21.96 | 62 | 0.17 | — | 110 | Foam open. |
| 17 | NMPM NMPNMP | 1.4 0.6 | 17.69 | 28 | 65 | 37 | 39.53 | 36 | — | — | — | Foam open. |
| 18 | NMPM NMPNMP | 1.5 0.5 | 16.81 | 31 | 72 | 41 | 33.67 | 44 | — | — | — | Foam very open. |
| 19 | NMPM NN'MPP | 1.0 1.5 | 17.54 | 28 | 65 | 37 | 42.46 | 39 | — | — | — | Foam med. tight. |
| 20 | NMPM NN'MPP | 1.5 1.2 | 17.84 | 28 | 65 | 37 | 40.99 | 40 | — | — | — | Foam med. tight. |
| 21 | NMPM NN'MPP | 2.0 0.8 | 17.96 | 29 | 70 | 41 | 38.06 | 43 | — | — | — | Foam open. |

TABLE 5

| EX. | DENSITY | COMPRESSION SET. 50% | COMPRESSION SET 90% |
|---|---|---|---|
| 10 | 1.9 | 32.1 | 43.3 |
| 11 | 1.98 | 22.5 | 39.3 |
| 13 | 1.82 | 65.5 | 74.3 |
| 17 | 1.86 | 31.3 | 71.8 |
| 18 | 1.9 | 30.5 | 47.2 |
| 19 | — | 35.3 | — |
| 20 | — | 48.4 | — |
| 21 | — | 41.0 | — |

We claim:

1. A catalyst for use in reacting an organic isocyanate with an organic polyol to produce a polyurethane, the catalyst comprising an at least mono-N-substituted alkoxyalkyl piperazine.

2. The catalyst of claim 1 wherein the alkoxyalkyl piperazine is an N-alkoxyalkyl piperazine generally described by the formula:

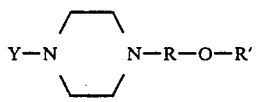

wherein:
Y is selected from the group consisting of (a) hydrogen; (b) alkyl groups having 1 to about 5 carbon atoms; and (c) the moiety generally described by the formula:

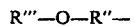

R and R" are independently selected from alkylene groups having 1 to about 5 carbon atoms; and
R' and R''' are independently selected from alkyl groups having 1 to about 3 carbon atoms.

3. The catalyst of claim 2 wherein Y is an alkyl group with 1 to about 3 carbon atoms.

4. The catalyst of claim 2 wherein at least one of R and R" is selected from the group consisting of ethylene, propylene and butylene moieties.

5. The catalyst of claim 2 wherein at least one of R' and R''' is selected from the group consisting of methyl or ethyl.

6. The catalyst of claim 1 wherein the piperazine is N-methoxypropyl piperazine.

7. The catalyst of claim 1 wherein the piperazine is N,N'-bismethoxypropyl piperazine.

8. The catalyst of claim 1 wherein the piperazine is N-methoxypropyl-N'-methyl piperazine.

9. The catalyst of claim 1 wherein the catalyst additionally comprises an N-alkoxyalkyl morpholine generally described by the formula:

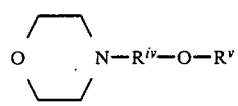

wherein:
$R^{iv}$ is an alkylene group with 1 to about 5 carbon atoms; and
$R^v$ is an alkyl group with 1 to about 3 carbon atoms.

10. The catalyst of claim 9 wherein $R^{iv}$ is selected from the group consisting of ethylene, propylene and butylene groups.

11. The catalyst of claim 9 wherein $R^v$ is selected from the group consisting of methyl or ethyl.

12. The catalyst of claim 9 wherein the morpholine is N-methoxypropyl morpholine.

13. The catalyst of claim 9 wherein the ratio of the morpholine to the piperazine is about 10:1-1:10.

14. The catalyst of claim 9 wherein the ratio of the morpholine to the piperazine is about 5:1-1:5.

15. A process for producing a polyurethane comprising reacting an organic isocyanate with an organic polyol in the presence of a catalyst comprising effective amount of an at least mono-N-substituted alkoxyalkyl piperazine.

16. The process of claim 15 wherein the alkoxyalkyl piperazine is an N-alkoxyalkyl piperazine generally described by the formula:

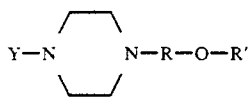

wherein:
Y is selected from the group consisting of (a) hydrogen; (b) alkyl groups having 1 to about 5 carbon atoms; and (c) the moiety generally described by the formula:

R'''—O—R''—

R and R'' are independently selected from alkylene groups having 1 to about 5 carbon atoms; and
R' and R''' are independently selected from alkyl groups having 1 to about 3 carbon atoms.

17. The process of claim 15 wherein the catalyst composition additionally comprises an N-alkoxyalkyl morpholine generally described by the formula:

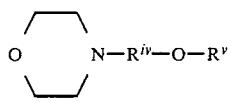

wherein:
$R^{iv}$ is an alkylene group having 1 to about 5 carbon atoms; and
$R^v$ is an alkyl group having 1 to about 3 carbon atoms.

18. The process of claim 17 wherein the ratio of the morpholine to the piperazine is about 10:1-1:10.

19. The process of claim 18 wherein the ratio of the morpholine to the piperazine is about 5:1-1:5.

20. The process of claim 15 wherein the catalyst composition is present in about 0.5–4 php.

* * * * *